Patented Jan. 2, 1923.

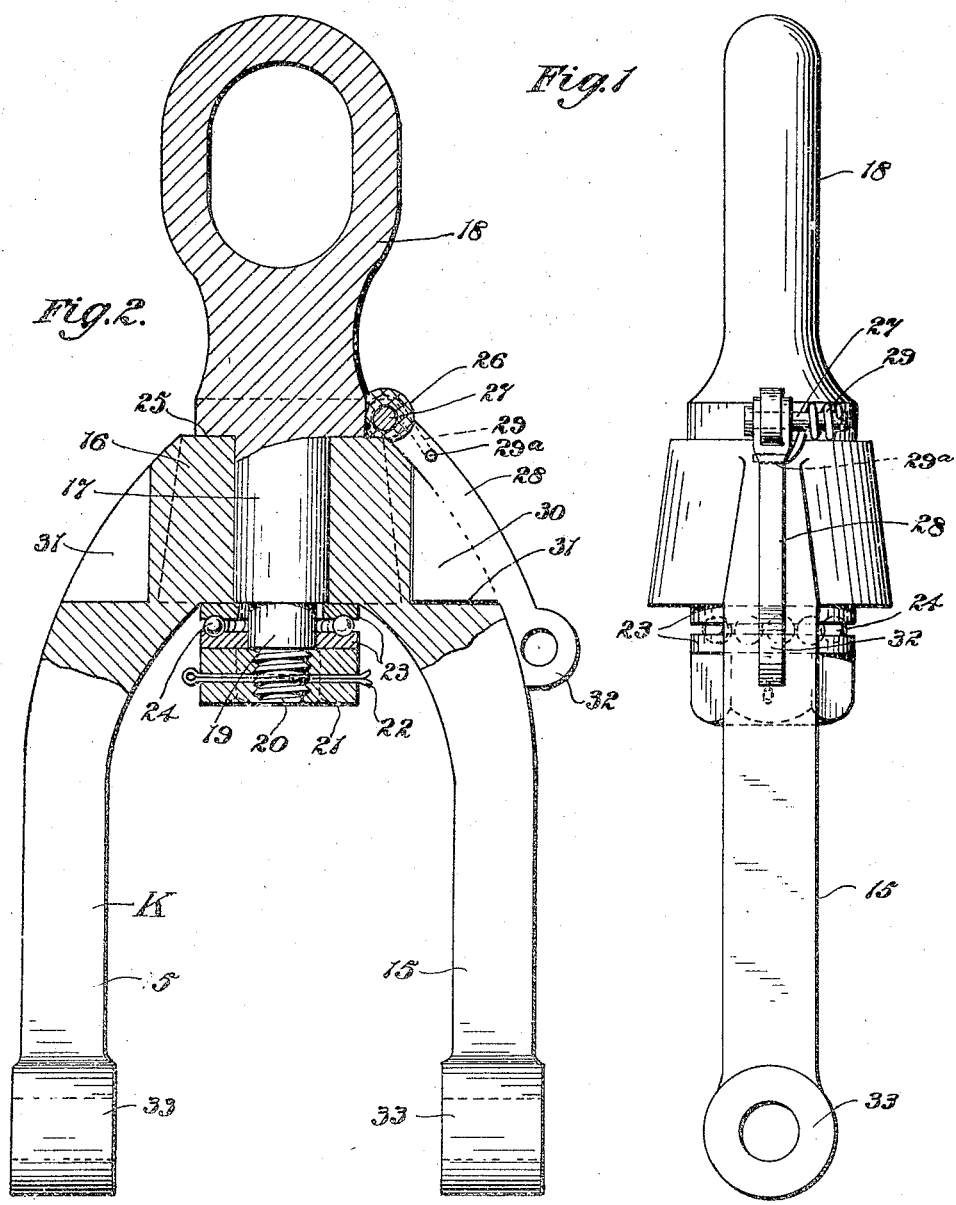

1,441,179

UNITED STATES PATENT OFFICE.

JAMES H. SCHUMACHER AND HENRY P. SCANLON, OF LONG BEACH, CALIFORNIA.

SWIVEL FOR TRAVELING BLOCKS.

Application filed November 9, 1921. Serial No. 514,097.

*To all whom it may concern:*

Be it known that we, JAMES H. SCHUMACHER and HENRY P. SCANLON, citizens of the United States, residing at Long Beach, in the county of Los Angeles and State of California, have invented new and useful Improvements in Swivels for Traveling Blocks, of which the following is a specification.

Our invention relates to swivels, and more particularly to swivels designed for connecting the rigging of a well drilling mechanism to the drill cable.

A purpose of our invention is a provision of a swivel of the above described character which is normally locked against rotation to permit of the rotation or oscillation of the drill and cable with the rigging, and which can be manually released to allow the free rotation of the rigging in effecting an untwisting of the cable as so often occurs in the drilling of wells.

We will describe one form of swivel embodying our invention and will then point out the novel features thereof in claims.

In the accompanying drawings,

Figure 1 is a view showing in edge elevation one form of swivel embodying our invention.

Fig. 2 is a view showing in side elevation, and particularly in section, the swivel shown in Fig. 1.

Referring specifically to the drawings, in which similar reference characters refer to similar parts, our invention, in its present embodiment, comprises a yoke portion K including parallel arms 15 connected by intermediate head portions 16. This intermediate portion is bored to receive a stub shaft 17 formed on the lower end with an eye or loop portion 18. The lower end of the stub shaft is provided with a reduced extension 19, and from this extension projects a threaded portion 20 adapted to receive a nut 21 locked thereon by cotter pin 22. This nut is designed to retain washers 23 upon the extension 19 and which have their confronting faces grooved to provide race ways to receive ball bearings 24. By this arrangement it will be seen that the yoke as a unit is rotatably sustained upon the stub axle 17 and with the least possible friction by virtue of the ball bearings 24.

At the junction of the stub axle 17 and the loop 18, a shoulder 25 is provided for limiting the downward movement of the stub axle within the bore 17 of the intermediate portion 16. Adjacent this shoulder 25 a pivot ear 26 is formed in which is mounted a pintle 27, and pivotally sustained on the pintle is a bifurcated end of a lever 28. One end of a coil spring 29 is fixed to the pintle 27, while the opposite end extends into a suitable opening formed in the lever as indicated at 29ª. Between the ends of the lever, a locking lug or projection 30 is formed which is adapted to engage within either of a pair of diametrically arranged recesses 31 formed in the intermediate portion 16 or the yoke K. The free end of the lever is provided with an eye 32 by means of which an operating rope or cable can be attached for swinging the lever outwardly against the tension of the spring 29 to withdraw the lug 30 from either of the recesses 31.

In the operation of the swivel, it will be understood that the spring 29 normally urges the lever 28 to the position shown in the drawings so that the lug 30 engages within one of the recesses 31. With the lever so positioned, the yoke K is locked against rotation upon the stub axle 17. This yoke is adapted to be connected through the medium of terminal ears 33 to a block of a drill supporting cable, while the loop 18 is connected to the block and tackle of the rigging. With the swivel so arranged it will be clear that with the lever in locking position, the yoke cannot be rotated so that the drill cable is held so that it moves with the rigging. However, when the lever is swung upwardly so as to withdraw the lug 30 from the recess, the yoke can now freely rotate about the stub shaft, so that should the drill rope or rigging become twisted to such an extent as to prevent the proper operation of the mechanism, the rotation of the yoke will permit of the untwisting of the cables.

Although we have herein shown and described only one form of swivel embodying our invention, it is to be understood that various changes and modifications may be made herein without departing from the spirit of the invention and the spirit and scope of the appended claims.

What we claim is:

1. A swivel comprising a loop portion, a yoke rotatably mounted on the loop portion, and pivoted means normally acting to lock the yoke against rotation but movable to a nonlocking position wherein rotation of the yoke is permitted.

2. A swivel comprising a stub axle, a loop sustained on the stub axle, a yoke rotatable on the stub axle and having recesses formed therein, and means engageable with the recesses for locking the yoke against rotation on the stub axle, said means being movable to nonlocking position.

3. A swivel comprising a stub axle, a loop sustained on the stub axle, a yoke rotatably mounted on the stub axle and having recesses formed therein, a lever pivotally sustained adjacent the loop, a lug formed on the lever and engageable with any of said recesses for locking the yoke against rotation upon the stub axle, said lever being normally urged to a position wherein said lug engages one of the recesses but movable to withdraw the lug from the recess to allow rotation of the yoke.

4. A swivel comprising a stub axle, a yoke rotatably mounted on the stub axle, a loop formed integral with the stub axle, recesses formed on the yoke, a pintle sustained on the loop, a lever pivotally supported on the pintle, a lug carried by the lever and engageable with any one of said recesses, a spring connecting said lever and pintle to normally urge the lever to a position wherein said lug engages within one of said recesses, and an eye formed in the free end of the lever to permit of the connection of a flexible element thereto for swinging the lever to a position wherein said lug is released or withdrawn from said recesses.

5. A swivel comprising a stub axle, a yoke rotatable on the axle, and a lug pivotally sustained on the axle and engageable with the yoke at various points to lock the latter in various adjusted positions on the axle.

6. A swivel comprising a loop portion, a yoke rotatably mounted on the loop portion, and means for locking the yoke against rotation without disturbing the relative longitudinal positions of the loop portion and yoke.

7. A swivel comprising a supporting member, a yoke associated with the member to only rotate thereon, and means movable to lock the yoke against rotation or to occupy a non-locking position in which rotation of the yoke is permitted.

In testimony whereof we have signed our names to this specification.

JAMES H. SCHUMACHER.
HENRY P. SCANLON.